United States Patent
Kam et al.

(10) Patent No.: US 8,812,988 B2
(45) Date of Patent: Aug. 19, 2014

(54) DYNAMIC ICONS ASSOCIATED WITH REMOTE CONTENT

(75) Inventors: Gordon Kam, Seattle, WA (US); Charles Goran, Seattle, WA (US); Eric London, Seattle, WA (US); Brian Ehrhart, Issaquah, WA (US); Larry Jordan, Sammamish, WA (US); Katherine Caricaburu, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 570 days.

(21) Appl. No.: 12/823,910

(22) Filed: Jun. 25, 2010

(65) Prior Publication Data
US 2010/0329642 A1     Dec. 30, 2010

Related U.S. Application Data

(60) Provisional application No. 61/220,895, filed on Jun. 26, 2009.

(51) Int. Cl.
*G06F 3/048*     (2013.01)

(52) U.S. Cl.
USPC ........... 715/837; 715/810; 715/825; 715/835; 715/838; 715/840

(58) Field of Classification Search
USPC .......... 715/753, 810, 825, 835, 837, 838, 840
See application file for complete search history.

(56) References Cited

U.S. PATENT DOCUMENTS

| | | | |
|---|---|---|---|
| 6,356,908 B1* | 3/2002 | Brown et al. | 1/1 |
| 7,831,928 B1* | 11/2010 | Rose et al. | 715/810 |
| 8,156,418 B2* | 4/2012 | Gowda et al. | 715/202 |
| 8,191,012 B2* | 5/2012 | Harris et al. | 715/838 |
| 8,234,575 B2* | 7/2012 | Hartin et al. | 715/744 |
| 2003/0167449 A1* | 9/2003 | Warren et al. | 715/531 |
| 2006/0020904 A1* | 1/2006 | Aaltonen et al. | 715/850 |
| 2007/0038934 A1* | 2/2007 | Fellman | 715/700 |
| 2007/0250511 A1* | 10/2007 | Endler et al. | 707/10 |
| 2009/0307603 A1* | 12/2009 | Gowda et al. | 715/749 |
| 2010/0095219 A1* | 4/2010 | Stachowiak et al. | 715/745 |
| 2010/0095221 A1* | 4/2010 | Doppler et al. | 715/747 |
| 2010/0293105 A1* | 11/2010 | Blinn et al. | 705/319 |
| 2011/0107227 A1* | 5/2011 | Rempell et al. | 715/738 |
| 2012/0036475 A1* | 2/2012 | Yoshitomi et al. | 715/810 |

* cited by examiner

*Primary Examiner* — Nicholas Augustine
(74) *Attorney, Agent, or Firm* — Lee & Hayes, PLLC

(57) ABSTRACT

Dynamic icons associated with remote content provide one or more pieces of information to a user by changing the appearance of the icon based on changes to data of a data source associated with the icon. For example, when the icon represents data available from a Really Simple Syndication (RSS) feed, the icon may be represented as an image extracted from the RSS feed, which may change when the RSS feed is updated or includes new content. In some embodiments, the icon may by dynamically updated based on user information and/or device information, such as an icon for a weather forecast that is based at least in part on a location of a device and thus directs the icon to show imagery and/or information based at least in part on the respective location.

20 Claims, 8 Drawing Sheets

DYNAMIC ICONS ASSOCIATED WITH REMOTE CONTENT

CROSS REFERENCE TO RELATED PATENT APPLICATIONS

This patent application claims priority from U.S. Provisional Application No. 61/220,895, filed Jun. 26, 2009, which application is hereby incorporated in its entirety by reference.

BACKGROUND

Modern computing devices, including personal computers, smart phones, tablet computers, music players, and other electronic devices often employ a user interface that enables a user to make various selections to control the device. These user interfaces typically use icons to represent different operations. When the icon is selected by the user, a respective function or application is called and/or run by the device. Users have become familiar with this use of icons, which involves static icons that include distinctive attributes that enable a user to recognize the icon and its association with the respective function or application. Since the inception in operating systems for personal computers, the implementation of icons has remained more or less unchanged. Icons are still employed as static images that occupy part of a display.

The popularity of mobile telecommunication devices continues to grow. These devices typically include a smaller display space than non-mobile computing devices, and thus effective use of the display space has become an increasing concern for software designers. Initially, many of the concepts used to control non-mobile computing devices were implemented in mobile telecommunications devices, despite differences in use, size, and functionality of mobile devices as compared to non-mobile devices. As mobile telecommunications devices continue to evolve, such as by more effectively accessing information from the Internet and other data, their control features and user interfaces should be improved to increase user experience when users interact with the devices.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, icons are used to enable users to trigger operations, such as functions or applications, when interacting with a user interface of a computing device. However, traditional icons used static images to identify the icon. Disclosed herein are dynamic icons associated with remote content that provide one or more pieces of information to a user by changing the appearance of the icon. In some embodiments, an icon may be represented by an image that is updated based on the content of a source of data associated with the icon. For example, when the icon represents data available from a Really Simple Syndication (RSS) feed, the icon may be represented as an image extracted from the RSS feed, which may change when the RSS feed is updated or includes new content. By changing the image used by the icon, or otherwise updating the icon, a user may be able to receive information from the icon that is otherwise unavailable with static icons. For example, the user may determine that the content associated with the icon (e.g., the RSS feed) has been updated and/or may determine information about the content before even selecting the icon to obtain the content. In some embodiments, the icon may by dynamically updated based on user information and/or device information. For example, an icon for a weather forecasting application or source may be updated based on a location of the device (e.g., via global positioning system (GPS), etc.), and thus show imagery and/or information based on the respective location.

The term "icon" as used throughout this disclosure is intended to include a button, link, or other visual command trigger, that when selected, directs software to perform a function on a computing device, such as open an application, retrieve data, load a page, open a new window, and so forth. The term "Image" as used throughout this disclosure is intended to include both still (e.g., photographs, etc.) and moving images (i.e. video).

The techniques described herein may be implemented in a number of ways. Example implementations are provided below with reference to the following figures.

Illustrative Environment

Figure 1:
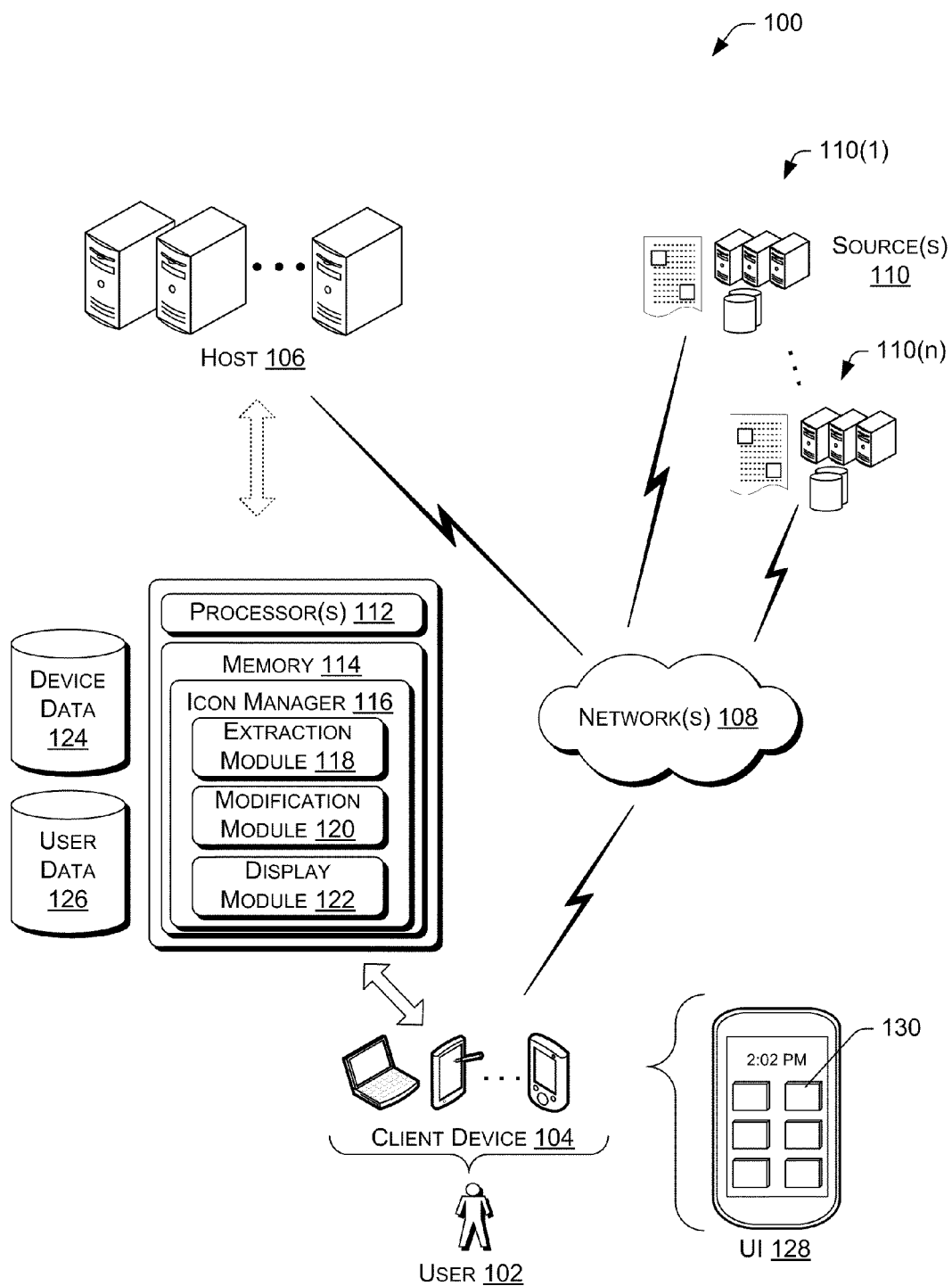
FIG. 1 is a schematic diagram of an illustrative computing environment to provide dynamic icons associated with remote content.

FIG. 1 is a schematic diagram of an illustrative computing environment 100 to provide dynamic icons associated with remote content. The environment 100 may include a user 102 and a client device 104. The client device 104 may be an electronic device capable of communicating with a host 106 via a network(s) 108. The network(s) 108 may be wired and/or wireless networks, such as without limitation a mobile telephone communications network, a wide-area network, or other types of networks.

The client device 104 may be a telecommunications device (e.g., a mobile telephone, smart phone, netbook, tablet, etc.), a personal computer, a tablet computer, a personal digital assistant (PDA), a television, a set top box, a gaming console, a music player, or another electronic device. The host 106 may be a source of data or a gateway to other data. For example, the client device 104 may submit a request for data to the host 106 and receive data directly from the host 106 or the host 106 may relay data from other sources 110(1)-110(n) and provide the date, either directly or indirectly, to the client device 104. The sources 110(1)-110(n) may be providers of data such as RSS feeds, weather information, news, entertainment information, social networking data, electronic marketplace data, or any other type of data that may be accessible via the network(s) 108 for use by the client device 104.

The client device 104 may include processor(s) 112 and memory 114. The memory 114 may store an icon manager 116, among other applications, operating systems, data, and/or or instructions. In various embodiments, the icon manager 116 may, by use of various modules, create, maintain, and update dynamic icons associated with remote content as disclosed herein. The icon manager 116 may include an extraction module 118, a modification module 120, and a display module 122.

The extraction module 118 may obtain data from the host 106 and/or the sources 110(1)-(n). The data may include text and/or images. In some embodiments the extraction module 118 may analyze data from the host 106 and/or the sources 110(1)-(n) and extract only a portion or subset of the available data. The extraction module 118 may also extract data from the client device, such as device data 124 and/or user data 126, which may be used to create, update, or maintain the dynamic icon.

The modification module 120 may modify the extracted data for implementation with the dynamic icon. For example, the modification module 120 may truncate text and/or reformat text. The modification module 120 may crop, resize, or otherwise modify any images obtained by the extraction module 118.

The display module 122 may generate a display for the dynamic icon using the extracted data and any modifications to present the icon for use on the client device 104. The display module 122 may trigger refreshing the data and/or modifications at periodic intervals, random intervals, event-based intervals, and so forth. The display module 122 may also select data for display based on the extracted data. For example, the extracted data may include horoscope information. The display module 122, upon receipt of the horoscope information, may analyze the horoscope information to determine a display attribute, such as a background color for the icon, which represents an aspect of the horoscope information, such as a horoscope mood, for example. The display module 122 may then generate the dynamic icon with the background color or other attribute.

In some embodiments, some or all of the modules and/or data may reside on the host 106. In such implementations, the host 106 may generate the icons via the icon manager 116 and then push the generated icon to the client device 104 for display to the user. Thus, the processing may be performed on the client device 104, the host 106, or allocated (and/or processed) between both the client device 104 and the host 106.

The client device 104 may include a user interface (UI) 128 which includes one or more instances of the dynamic icon 130. The UI 128 may be an operating system, an application (browser), and/or another type of software that enables a user to make selections of operations via the dynamic icon 130.

Figure 2:
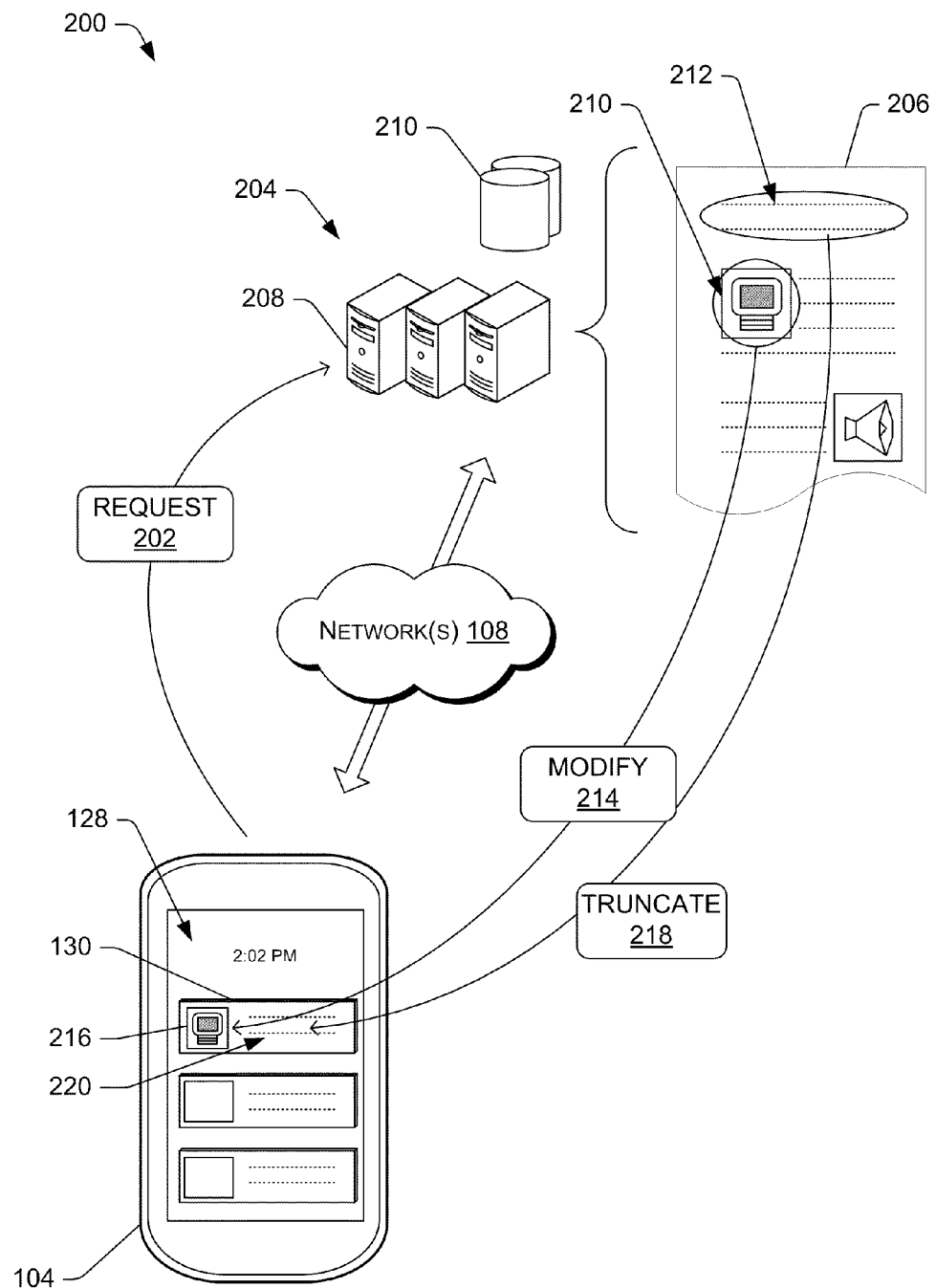
FIG. 2 is a schematic diagram that shows creation of an illustrative dynamic icon associated with remote content.

FIG. 2 is a schematic diagram of a process 200 to create an illustrative dynamic icon associated with remote content. The process 200 is described with reference to the environment 100.

The client device 104 may transmit a request 202 to an entity 204 (e.g., the host 106 and/or the sources 110 of FIG. 1, etc.). The request 202 may be a request for data 206 available from, for example and without limitation, an RSS feed, a document, a uniform resource locator (URL) address, and so forth. Upon receipt, the entity 204 may obtain, via servers 208, the data 206 from a data store 210.

The data 206 may include images (e.g., still images, video, etc.) and/or text. The entity 204, in response to the request 202, may transmit an image 210, text 212, or both to the client device 104. In some embodiments, the entity 208 may transmit multiple images and/or selections of text to the client device 104. The image 210 may be modified 214, such as by the modification module 120, and then incorporated into the dynamic icon 130 as a modified image 216, such as via the display module 122. Similarly, the text 212 may be truncated 218, such as by the modification module 120, and then incorporated into the dynamic icon 130 (or simply "icon") as modified text 220, such as via the display module 122. Thus, the dynamic icon 130 may include attributes of the data 206, which can be viewed by the user 102 on the UI 128 prior to selection of the icon 130. Upon selection of the icon 130, the client device 104 may show additional portions of the data 206, which may include the image 210 and text 212, which may or may not be otherwise modified, in addition to other possible images and text contained in the data 206.

The icon manager 116 may repeat the request 202 randomly, upon user request, an event-based request, and/or periodically to update (refresh) an appearance of the icon 130. For example, the data 206 may be extracted from a source that is frequently updated, such as news reporting service, stock market data repository, weather source, or other data that is frequently updated. After the data is updated, the icon manager 116 may generate another request (such as the request 202) that extracts the data 206 (now updated) and creates the icon 130 using the updated data. In this way, the icon 130 is dynamically updated after the data 206 is updated, and thus provides dynamically updated information to allow the user 102 to assess the content associated with the icon based on the appearance of the icon 130. Although the process 200 discusses extraction of both the image 210 and the text 212, embodiments may include extraction of only text or only images.

Illustrative Dynamic Icons

FIGS. 3a-e show illustrative dynamic icons associated with remote content in accordance with some embodiments. Representative illustrative dynamic icons are discussed in turn; however, other types of icons may be generated by the icon manager 116 in accordance with the techniques described herein.

Figure 3A:
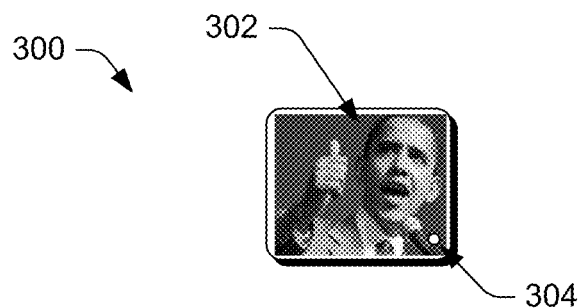
FIGS. 3a-e show illustrative dynamic icons associated with remote content in accordance with some embodiments.
Figure 3B:

FIG. 3b shows an icon 300 that may be generated from the data 206, such as an RSS feed of data or a URL address of a site, for example. The icon 300 is shown as having an image 302 that is dynamically updated based on a respective image in the data 206. The image 302 may be reformatted, resized, and/or cropped from an original image (e.g., the image 210) before being incorporated in the icon 300 by the display module 122.

In some embodiments, the icon 300 may include an expand feature 304 that enables the user to expand the icon 300 to a larger view icon, such as the icon 306 described below with reference to FIG. 3b. In various embodiments, the expand feature 304 may be included in the UI 128, such that when selected, the expand feature expands all icons in the UI to larger views that include additional dynamic information.

FIG. 3b shows an icon 306 that may be generated from the data 206. As discussed above, the icon 306 may be an expanded form of the icon 300 or may be a default icon. The icon 306 is shown as having a first portion 308 and a second portion 310, however more or fewer portions may be designated within the icon. The first portion 308 may include an image 312. The image 312 may be reformatted, resized, and/or cropped from an original image (e.g., the image 210) before being incorporated in the icon 306 by the display module 122.

The second portion 312 of the icon 306 may include a title 314 and a snippet 316. The title 314 may be a title of the icon 306, which may be static, or a title or heading associated with the data 206, namely the snippet 316, and thus be dynamically updated upon an update of the data 206 (e.g., subsequent news story, etc.). The title 314 and/or the snippet 316 may be a result of a truncation or other modification of text by the modification module 120, such as to reduce a number of characters, symbols, words, etc. to a predetermined threshold based on space constraints or other factors associated with the icon 306. Thus, the snippet 316 may be a portion of text in the data 206, which may be accessible in full (or to a greater degree) by user-selection of the icon 306.

In some embodiments, the image 312, the title 314, and the snippet 316 may not be related with a same piece of content in the data 206. For example, the image 312 may be associated with a first article of a news site while the snippet is extracted from a second article of the news site, and so forth.

In some embodiments, the image 312 may be a video. The video may be modified, such as to reduce a length of the video, to loop the video, to reduce a pixel quality and/or frame rate, or otherwise modified by the modification module 120 to enable playing the video on the icon 306. In various embodiments, the video used for the icon may be paused (rendered as a still image) until the icon is in focus (e.g., selected, mouseover, etc.). The video may return to the still image when the icon is removed from the focus.

Figure 3C:
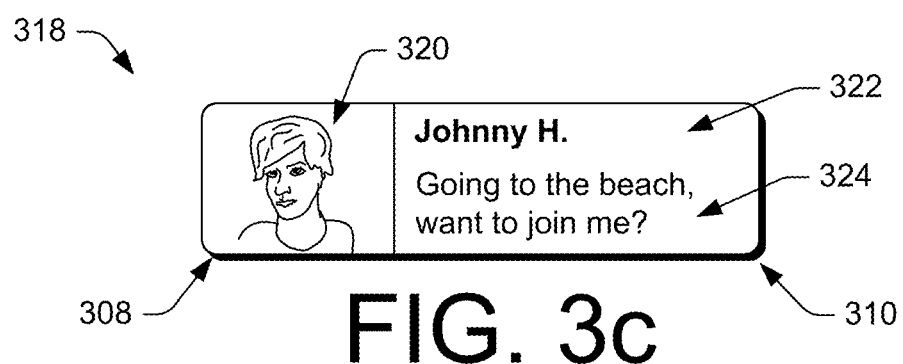

FIG. 3c shows an icon 318 that may be generated from data 206, such as data from a social networking site, for example. The first portion 308 of the icon 318 includes an image 320. The image 320 may be selected based on recent activity of a member of a social network that provides the data 206. The second portion 312 of the icon 318 may include heading 322 and a message 324. The heading 314 may be a name of a person, such as the person associated with the image 320. The message 324 may be a message generated by the person, or by the social network based on activity of the person. For example, the message 324 may be extracted from text written by the person in a status update, on-going activity feed, or other types of messages. Thus, the icon 318 may be associated with the social network site, but display information on a latest update or other relevant information that may be of interest to the user 102. In some embodiments, the user may designate attributes of the icon 318, such as to track individual people on the social networking site or other type of site that facilitates user activity and/or messaging.

Figure 3D:

FIG. 3d shows an icon 326. The icon 326 includes the first portion 308 showing a symbol 328 and a background 330. The symbol 328 and the background 330 may be based in part on the data 206 associated with the icon 326 and/or device data 224 and user data 226. For example, when the icon 326 is associated with horoscope data (the data 206), then the symbol 328 may be selected based on the user data 226 that indicated the sign of the user 102 (e.g., Capricorn). The background 330 may be selected based on another attribute of the horoscope data, such as a horoscope "mood" or other type of attribute. For example, if the horoscope mood is positive, then the background 330 may be displayed as a warm color (yellow, red, etc.) and when the horoscope mood is negative, the background 330 may be displayed as a cool color (green, blue, etc.). Thus, by using the symbol 328 and the background 330, the icon 326 may provide dynamic information based on the data 206 (e.g., horoscope data, user data, etc.). In addition, the icon 326 may include a title 332 and a snippet 334, or other information relevant information.

Figure 3E:
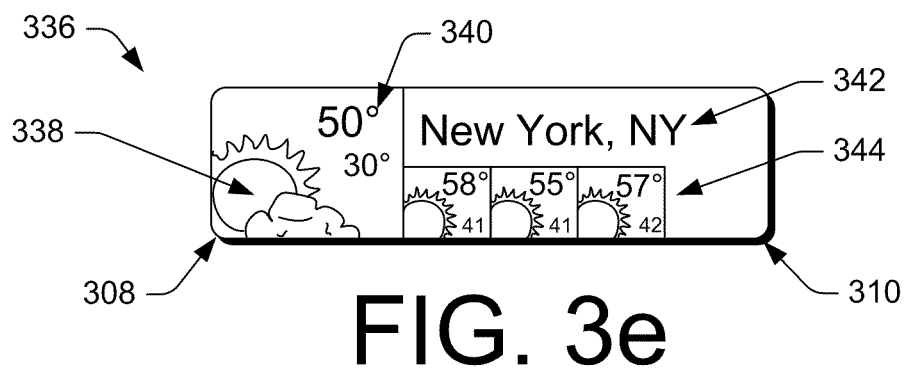

FIG. 3e shows an icon 336. The icon 336 includes the first portion 308 showing a symbol 338 and data 340. The symbol 338 may be an image that represents an attribute of the data 206 that is associated with the icon 336. For example, when the data 206 is weather data, the symbol 338 may be selected based on the weather data. The symbol 338 may be extracted with the data 206 (e.g., from the entity 204) or may be stored locally, such as on the client device 102 and mapped to the data 206 (or portion thereof). For example, the data 206 may only be text based data that includes words such as "partly sunny" and so forth. Some words may be linked to symbols, which upon the detection of the words, may trigger selection of the symbol 338. Thus, otherwise plain text may be enhanced with imagery using the symbol 338.

The second portion 310 of the icon 336 may include additional information, such as additional imagery 344, text 342, or other data based at least in part on the data 206 extracted from the entity 204. For example, when the icon 336 is for a weather forecasting site, the additional imagery 344 may include additional symbols and text for subsequent days, which may be assembled using techniques similar to those used to create the information (imagery) of the first portion.

The data 206 associated with the icon 336 may be selected based in part on the device data 224 and/or the user data 226. For example, the icon manager 116 may determine a location of the client device 104 (via the device data 124, GPS, triangulation, etc.) and/or by a user selected preference or location. Thus, the icon 336 may display information (the symbol 338, etc.) that is relevant to the user 102.

Although the icons 306, 318, 326, and 336 show both images and text, the icons may also be implemented without images and/or without text in accordance with this disclosure.

Illustrative Operation

Figure 4:
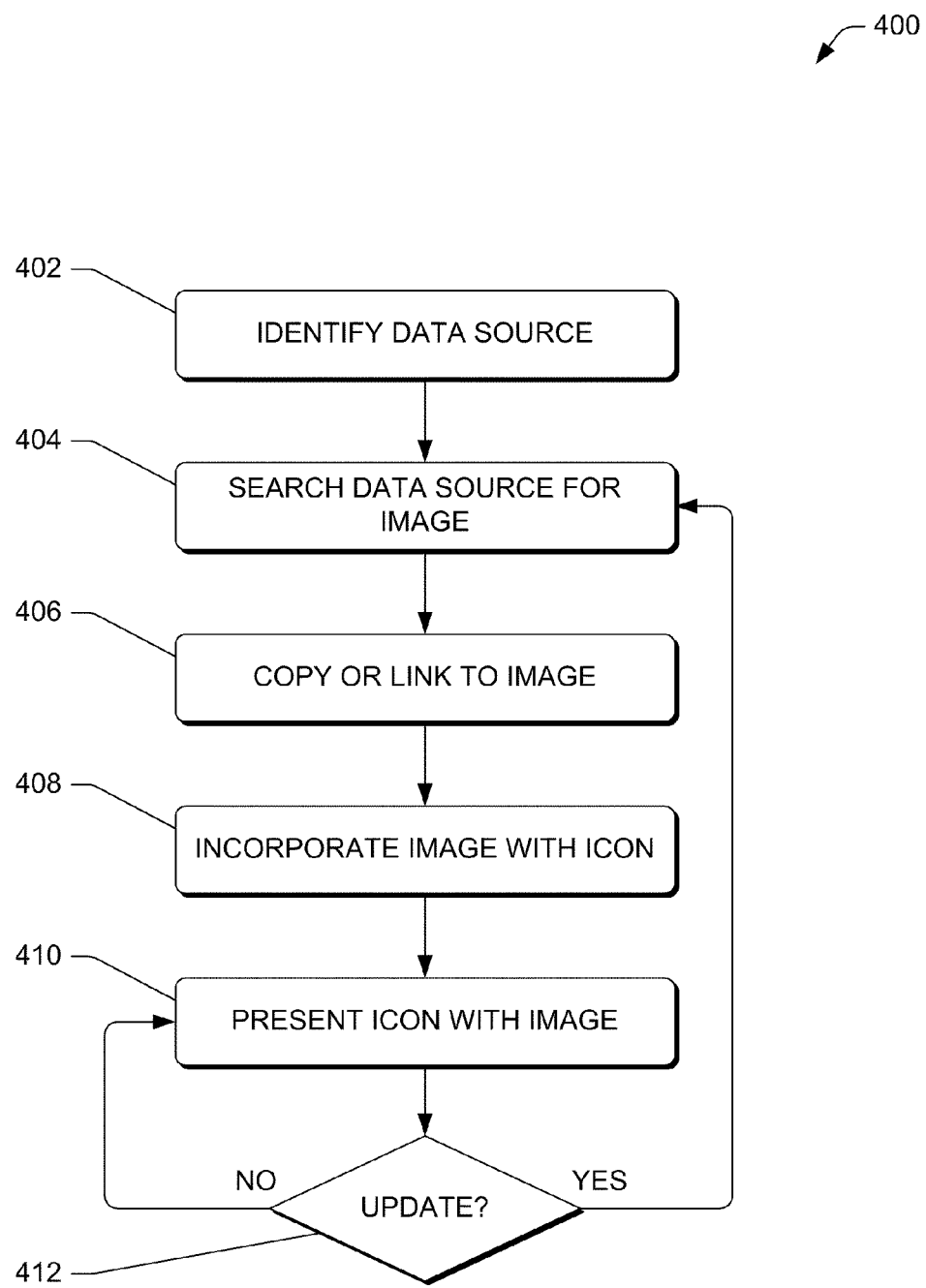
FIG. 4 is a flow diagram of an illustrative process to create a dynamic icon associated with remote content.

FIG. 4 is a flow diagram of an illustrative process 400 to create a dynamic icon associated with remote content. The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly.

At 402, the extraction module 118 may identify a source associated with the icon 130. For example, the source may be a RSS feed, a document, a URL address, or any data accessible to the client device 104 (local or remotely-located), which is updated periodically include new data of text and/or images. In some embodiments, the source may be initially identified or associated with data based in part on user input. Thus, the user 102 may create and/or customize an icon by linking the icon to dynamic content that, when accessible, enables creation of the dynamic icon 130.

At 404, the extraction module 118 may search the data 206 available from the source for an image, which when extracted, may be used by the icon 130. The extraction module 118 may select a first image of the data, select a random image, or select an image in a designated position (e.g., left most, top image, third image, etc.).

At 406, the extraction module 118 may copy or create a link to the image. For example, the image may be copied to cache and then linked to the icon for use when rending the icon. When an image is copied, the image may also be resized to a smaller file size, resolution, pixel resolution, and so forth, which may be performed in part by the modification module 120. In some embodiments, a link may be established between the icon and the image to enable display of the image, with possible modifications in format and/or size, by the client device 104.

At 408, the display module 122 may incorporate the image with the icon 130. The display module 122 may redirect the icon to a different image, change the name of the image to an image name called by the icon, integrate the image with the icon, or otherwise incorporate the image with the icon 130.

At 410, the display module 122 may render the icon with the image. For example, the icon may be made visible and/or selectable by the user 102 via the user interface 128.

At 412, the icon manager 116 may determine whether to update the icon. The update may be performed periodically, based on user input, and so forth. For example, the icon manager 116 may cycle through all of the dynamic icons on the UI 128 and update each icon on a periodic basis. In some embodiments, the icon manager 116 may update icons when the client device 104 is in use (e.g., after a wake, return to the UI 128, etc.). When icon manager 116 updates the icon 130 at 412, the process may return to operation 404 to update the icon, otherwise the icon may remain viewable with the current image at 410.

Although the process 400 is described as extracting image, the process may also extract text for display with the image in the icon 130. This process, as well as selection of images and/or text based on local data (e.g., the device data 124 and the user data 126) is described in more detail below.

In an example implementation of the process 400, the process may be used to select an image for rendering in the icon based on a photo album, which may be stored locally on the client device 104 (e.g., in the device data 124 and/or the user data 126, etc.) or at a remote location. The photo album may be occasionally updated with new photos. The extraction module 118 may extract a photo (image) from the photo album for rendering with the icon. In some embodiments, the extraction module 118 may randomly select a photo for the rendering thereby changing the appearance of the icon on a random or periodic basis to make the icon dynamic.

Figure 5:
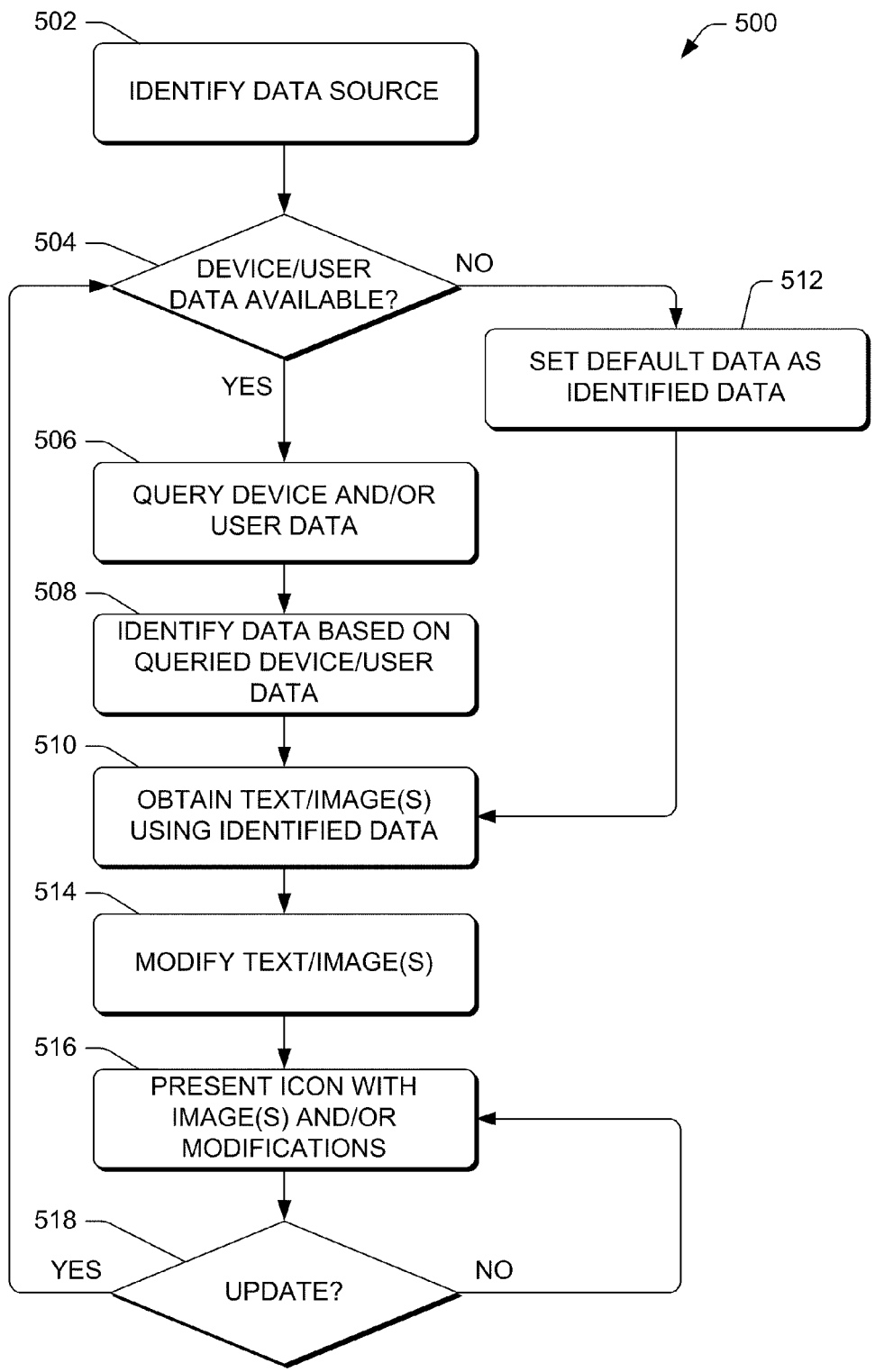
FIG. 5 is a flow diagram of an illustrative process to create a personalized dynamic icon using local data.

FIG. 5 is a flow diagram of an illustrative process 500 to create a personalized dynamic icon using local data. For example, the process 500 may enable creating and updating the icon 326 shown in FIG. 3c and/or the icon 336 shown in FIG. 3d.

At 502, the extraction module 118 may identify a data source of the data 206. At 504, the extraction module 118 may determine whether the device data 124 and/or the user data 126 are available to use to customize the data extracted from the source as identified at the operation 502.

When the device data 124 and/or the user data 126 are available, the extraction module 118 may query the device data 124 and/or the user data 126 to determine relevant information. For example, when the icon that is updated via the process 500 is the icon 326 (i.e., the horoscope icon), then the extraction module may query the user data 126 to determine a birth date of the user, for example. When the icon that is updated via the process 500 is the icon 336 (i.e., the weather icon), then the extraction module may query the device data 124 to determine a location of the client device 104, such as via a GPS location, for example.

Continuing down this route, at 508, the extraction module 118 may identify data based on the queried device data and/or queried user data from the operation 506. For example, the extraction module 118 may identify a particular horoscope based on a birth date (the queried user data) or may identify weather data for a particular location based on an address or GPS data point (the queried device data). Other types of device data and user data may also be used to obtain related information other than weather and horoscope data.

At 510, the extraction module 118 may obtain text and/or images using identified data. When the device data 124 and/or the user data 126 is determined to be unavailable at 504, the identified data may be set as the default data (or vice versa) at 512 and the process 500 may proceed with the operation 510, which may use the default data. Thus, when the device data 124 and/or the user data 126 is unavailable (either temporarily or permanently), some icons may display default data (images/text), which may be updated (cycled) when other icons are updated to create a dynamic appearance of the icon.

At 514, the modification module 120 may modify data for presentation with the icon. For example, the modification module 120 may format an image, truncate or otherwise selectively edit textual data, or otherwise select a subset of data (text and/or images) identified at the operation 508 for inclusion in the icon 130.

At 516, the display module 122 may present the icon with the image(s) and/or the text, which may or may not be modified by the modification module 120 at the operation 514.

At 518, the icon manager 116 may determine whether to update the icon. The update may be performed periodically, based on user input, and so forth. When icon manager 116 updates the icon 130 at 518, the process may return to operation 504 to update the icon, otherwise the icon may remain viewable with the current image at 516.

Figure 6:
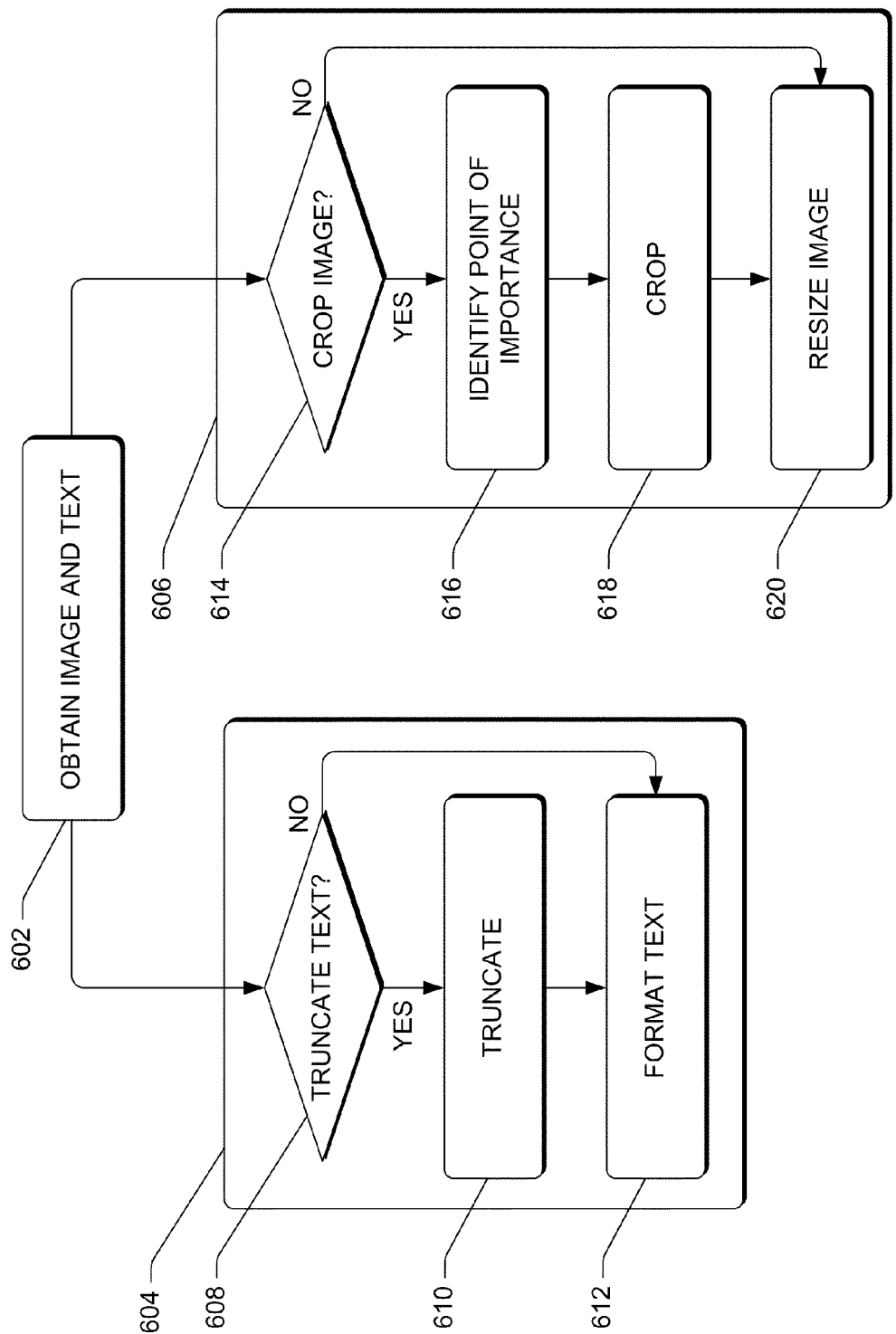
FIG. 6 is a flow diagram of an illustrative process to modify text and/or images extracted from a source.

FIG. 6 is a flow diagram of an illustrative process 600 to modify text and/or image extracted from a source. At 602, the extraction module 118 may obtain one or more image and/or text from a source, such as described with reference to the operations 402 through 406 in FIG. 4 and/or operation 504 through 512 in FIG. 5.

The modification module 120 may modify text obtained at the operation 602 using a sub-process 604. The modification module 120 may modify an image obtained at the operation 602 using a sub-process 606. Each sub-process is discussed in turn.

In the sub-process 604, at 608, the modification module 120 may determine whether to truncate text obtained at the operation 602. The truncation may include reducing words, abbreviating words, selecting a subset of text, or otherwise reducing an amount of text obtained at the operation 602. When the modification module 120 determines to truncate the text at 608, the text truncation is performed at 610. Regardless of whether text truncation is performed, the modification module 120 may format the text at 612. The formatting may include changing or setting a font, font size, spacing, or other formatting information to adjust presentation of the text.

In the sub-process 604, at 614, the modification module 120 may determine whether to crop an image obtained at 602. When cropping is selected at 614, at 616, the modification module 120 may identify an area of interest in an image. For example, when the image is of a person, the area of interest may be a face of the person. When the cropping is performed, the image may be cropped to include the area of interest. In some instances the area of interest may be a boundary and may include a size ratio (width/height) that may correspond to a size ratio used in the icon. At 618, the modification module 120 may crop the image using the area of interest information at 616.

At 620, regardless of whether cropping is performed, the image may be resized to fit the icon. In some embodiments, the resizing the image (such as a still image and/or a moving image (video)) may include reducing a resolution, frame rate, run time (duration of the video), width, height, or other attributes of the image or images.

The operations described in the sub-processes 604 related to modifying text and the sub-processes 606 related to modifying images may be performed in the respective portions in the processes 400 and 500.

Figure 7:
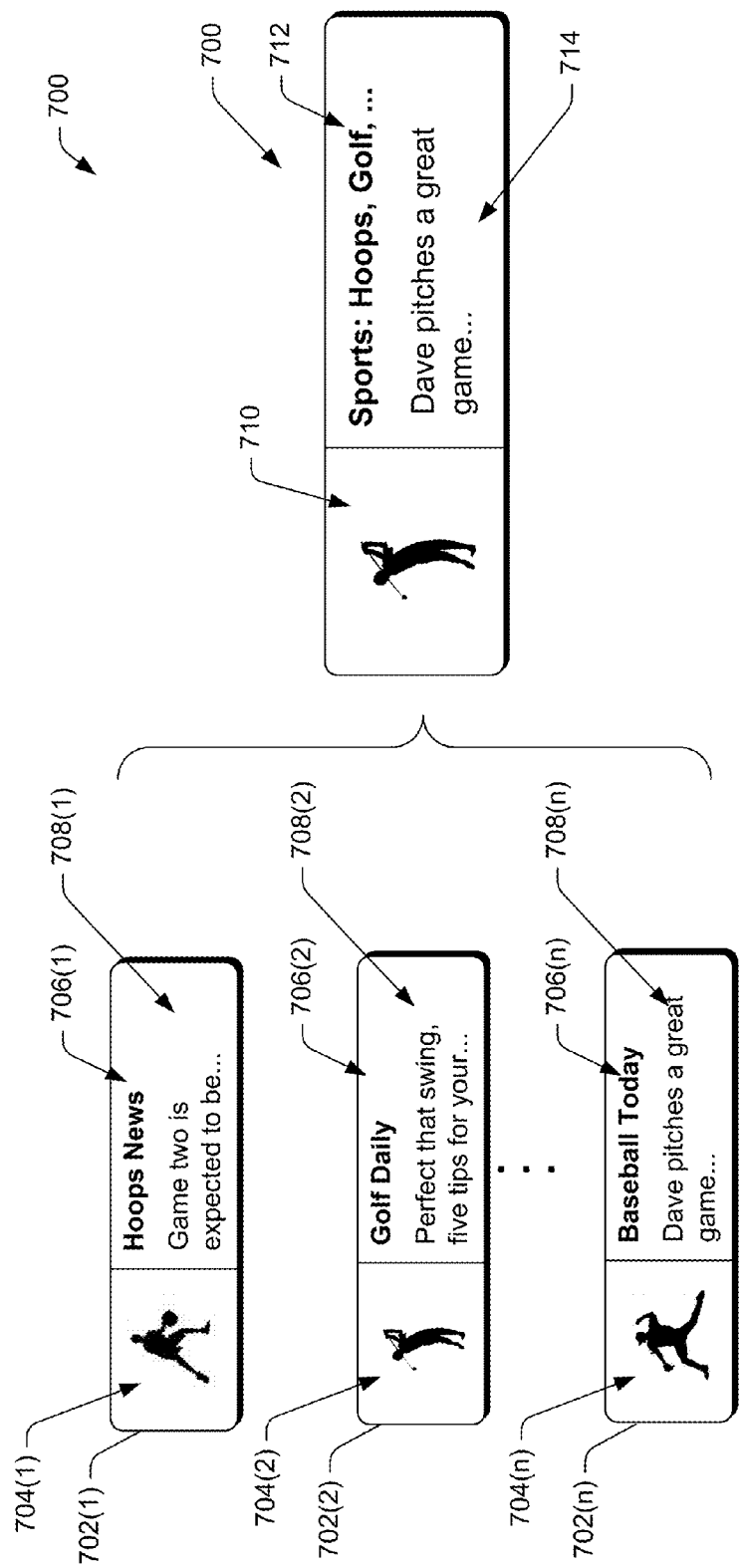
FIG. 7 is schematic diagram of an illustrative dynamic icon collage.

FIG. 7 is schematic diagram of an illustrative dynamic icon collage 700 ("icon collage"). The icon collage 700 may enable a depiction of one or more of multiple instances of the icon 130 via a single icon collage. The icon collage may then be dynamically updated based on the content of the single icons.

As shown in FIG. 7, a plurality of icons 702(1)-(n) may be available for display on the client device 104, such as via the UI 128 shown in FIG. 1. Each of the icons may include a selection of dynamic information, such as an image 704(1)-(n), a title or header 706(1)-(n), and/or a snippet of text 708(1)-(n).

The collage icon 700 may include an image 710 selected from one of the images 702(1)-(n), a title or header 712 selected from one of the title or header 706(1)-(n), and/or a snippet of text 714 selected from one of the snippets of text 708(1)-(n). Thus, the collage icon 700 may represent one or more parts of the icons 702(1)-(n), which when viewed, may enable the user 102 to determine content available from one of the icons 702(1)-(n) by viewing the icon collage 700. In some embodiments, the icon collage 700, when selected, may present the icons 702(1)-(n) for display to the user. The dynamic information of the icon collage 700 from the icons 702(1)-(n) may be updated on a periodic basis, random basis, or after user input, such as interaction with the client device 104. In accordance with embodiments, the icon collage 700 may be customized by the user 102 to enable assignment and/or association with various icons, such as the icons 702(1)-(n).

In some embodiments, the icon collage 700 may cycle through the available images 702(1)-(n) to create a slideshow of the images for display via the icon. In various embodiments, the icon 130 may cycle through various images obtained from the data 206 to create a slideshow. Thus, the icon 130 may show multiple images over time using a dynamically updated slideshow of images available from the data 206.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of creating a dynamic icon, the method comprising:
    associating an icon with data available via a network, the icon enabling access to the data upon user-interaction with the icon, the data being periodically updated to modify content included in the data;
    selecting, by one or more processors, an image from the data, the image being updated upon an update of the data;
    extracting the image for use with the icon;
    resizing the image based at least in part on a size specified for the icon;
    selecting text from a text field in the data;
    truncating the text to include a lesser amount of the text than an amount of the text included in the field of the data;
    causing a display of the icon with the resized image, the truncated text, and an expand feature control to access an expanded version of the icon that includes at least dynamic information in addition to the truncated text, the dynamic information including additional text from the text field in the data that is in addition to the truncated text; and
    causing a display of the expanded version of the icon in response to a selection of the expand feature control.

2. The method as recited in claim 1, wherein the data is provided from a Really Simple Syndication (RSS) feed of data.

3. The method as recited in claim 1, further comprising cropping the image by selecting an area of interest and then removing a portion of the image outside of the area of interest.

4. The method as recited in claim 1, wherein the image is a video.

5. The method as recited in claim 4, further comprising reformatting the video to reduce at least one of a frame rate or a resolution of the video.

6. A method, comprising:
    monitoring data from a data source to detect an update to the data;
    determining, based at least in part on the monitoring, that the data from the data source has been updated to create updated data such that the content of updated data is only partially different than the data prior to the update;
    identifying an icon that is associated with the updated data, the icon to facilitate access to the updated data upon user-interaction with the icon;
    in response to the determining the update of the data:
        selecting, by one or more computing devices, the updated data from the data source associated with an icon;
        locating an image that is available in the updated data;
        selecting at least a portion of text in a text field included in the updated data;
        causing a display of the icon with the image, the at least a portion of the text, and an expand feature control to access an expanded version of the icon that includes at least dynamic information in addition to the at least a portion of the text, wherein the dynamic information includes additional text from the text field in the updated data that is in addition to the at least a portion of the text; and
        causing a display of the expanded version of the icon in response to a selection of the expand feature control.

7. The method as recited in claim 6, further comprising identifying local data prior to the selecting the data from a data source associated with an icon, the local data used to select the data from the data source.

8. The method as recited in claim 7, wherein the local data includes at least one of a location of a client device that displays the icon or personal information of a user associated with the client device.

9. The method as recited in claim 6, further comprising modifying the image for presentation on the client device by performing at least one of resizing the image, cropping the image, or reducing a resolution of the image.

10. The method as recited in claim 6, wherein the image and the at least the portion of text are separate in the updated data such that at least the portion of the text is disassociated from the image in the updated data.

11. One or more non-transitory computer-readable media storing computer-executable instructions that, when executed, cause one or more processors to perform acts comprising:

determining a source of data that is associated with an icon;

analyzing the data to identify at least an image included in the data;

modifying the image by at least one of cropping the image or resizing the image;

truncating text from the data to reduce an amount of the text to an amount less than or equal to a predetermined threshold amount of text;

causing a display of the modified image and the truncated text in the icon;

linking a control associated with the icon to an expanded version of the icon, the expanded version of the icon to include dynamic information that includes at least one of an another image or additional text from the data that is in addition to the truncated text and the modified image; and causing a display of the expanded version of the icon in response to a selection of the control.

12. The one or more non-transitory computer-readable media as recited in claim 11, wherein the acts further comprise:

identifying an area of interest in the image; and cropping the image to preserve the area of interest.

13. The one or more non-transitory computer-readable media as recited in claim 11, wherein the acts further comprise:

querying at least one of user data or device data to identify an attribute used to select the data, and wherein the analyzing the data from the source is based at least in part on the attribute.

14. The one or more non-transitory computer-readable media as recited in claim 11, wherein the source is a social networking site, and the data is a most recent post associated with a user that has access to the source.

15. The method as recited in claim 1, further comprising, in response to a received selection of the expand feature control:

selecting the additional text from the text field in the data; and creating the dynamic information using at least the additional text.

16. The method as recited in claim 1, wherein the expand feature control is activated by clicking on or tapping on the icon.

17. The method as recited in claim 6, wherein the image is a video.

18. The method as recited in claim 17, further comprising reformatting the video to reduce at least one of a frame rate or a resolution of the video.

19. The one or more non-transitory computer-readable media as recited in claim 11, wherein the acts further comprise creating the expanded version of the icon by:

selecting the additional text from the data;

selecting the other image from the data; and creating the dynamic information using at least the additional text and the other image.

20. The one or more non-transitory computer-readable media as recited in claim 11, wherein the acts further comprise receiving a user-selection of the source of the data that associates the source of data with the icon.

\* \* \* \* \*